DETECTOR CIRCUITRY AND SEMICONDUCTOR DEVICE THEREFOR

Filed June 21, 1961 3 Sheets-Sheet 1

INVENTORS
John D. Husher &
Bernard T. Murphy
BY D. J. Smith
ATTORNEY

DETECTOR CIRCUITRY AND SEMICONDUCTOR DEVICE THEREFOR

Filed June 21, 1961 3 Sheets-Sheet 3

United States Patent Office 3,213,380
Patented Oct. 19, 1965

3,213,380

DETECTOR CIRCUITRY AND SEMICONDUCTOR DEVICE THEREFOR

John D. Husher and Bernard T. Murphy, Greensburg, Pa., assignors to Westinghouse Electric Corporation, East Pittsburgh, Pa., a corporation of Pennsylvania Filed June 21, 1961, Ser. No. 118,600
14 Claims. (Cl. 329—101)

The present invention relates to circuitry arranged for detecting and amplifying the modulating information from a modulated carrier signal and more particularly to circuitry arranged in the form of a monolithic semiconductor device for this purpose.

Where a carrier signal of relatively high frequency is modulated, for example in amplitude, by a signal of relatively low frequency, it is ordinarily necessary to provide in receiving devices the functions of detecting and amplifying the modulating information from the modulated carrier signal. In this manner, communication or transmittal of electrical information can be obtained through selective use of the available ones of a wide range of transmitting frequencies. The efficiency with which the detecting function is produced depends upon factors including the degree to which the carrier signal is attenuated during the detecting operation.

When solid state circuitry is so formed as to function as a detecting or a detecting-amplifying device, several inherent advantages are obtained. For example, filtering obtained through the use of capacitive and resistive effects distributively existing over the geometrical volume of the device, or a portion of the same, produces superior or sharper attenuation of the carrier frequency components in the detected signal as compared to that produced by an analogous circuit having integrated circuit elements. That this is true may be evidenced mathematically as well as empirically. In addition, the advantages of miniaturization and reliability are also obtained.

Thus, it is an object of the invention to provide novel circuitry including a monolithic semiconductor device for detecting the modulating information from a modulated carrier signal.

It is another object of the invention to provide a novel semiconductor device for detecting and amplifying the modulating information from a modulated carrier signal.

These and other objects of the invention will become more apparent upon consideration of the following detailed description along with the attached drawings, in which.

In accordance with the broad principles of the invention, a body of semiconductive material is so formed geometrically as to enable the body to function as a detecting device. The detection is provided through the use of responding means which operate resistively and capacitively to attenuate the carrier frequency components of the modulated carrier signal yet to produce the modulating information. In addition, the responding means utilizes a rectifying effect in providing the detecting function. The device can also be formed so that the responding means amplifies a detected or partially detected signal, and the amplifying means can further filter the signal substantially to free it of carrier frequency components and thereby enhance the detecting function of the device. In the detecting device, the responding means may be provided in the semiconductive body in the form of adjoining regions of opposite semiconductivity types with a p-n junction therebetween and with the junction either being free of external bias or being forwardly biased. In the detecting-amplifying device, the responding means may generally include the functioning elements just described as well as additional regions, for example a p-n-p or an n-p-n combination, coupled with the first mentioned regions and functioning as an amplifier. If desired, use may be made of additional volume in the body for other circuit effects, such as a load resistive effect.

Figure 1:
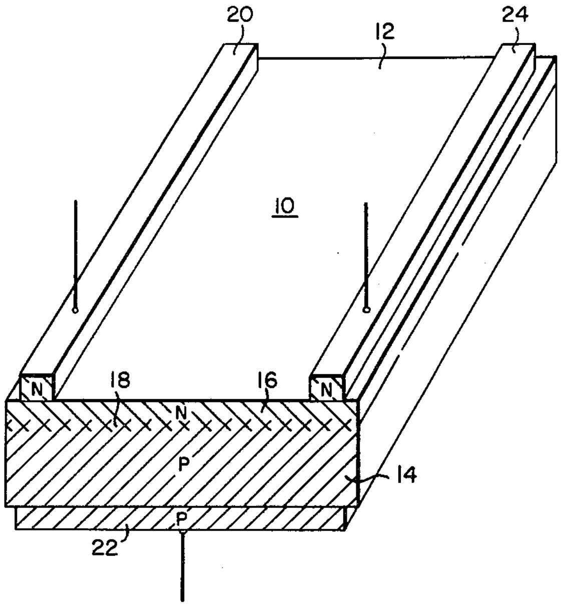
FIGURE 1 is a perspective view partly in cross section of a semiconductor device fabricated in accordance with the principles of the invention.

For an illustration of these broad principles, reference is now to be made to FIG. 1 where there is shown a semiconductor detecting device 10. The semiconductive bulk material used in the detecting device 10 may be silicon, germanium, silicon carbide, or stoichiometric compounds of elements of group III and group V of the periodic table, for example indium arsenide, indium antimonide, gallium arsenide, and gallium antimonide, or stoichiometric compounds of group II and group VI of the periodic table, for example cadmium sulfide. In some applications, it may even be desirable to utilize two different bulk materials for forming different regions in the semiconductor device 10.

To produce n-type or p-type regions in the detecting device 10, any of the methods known to those skilled in the pertinent art can be employed. For example, where an n-type region is desired in silicon or germanium, a donor dopant may be employed and it can be at least one element from group V of the periodic table, for example arsenic, antimony or phosphorus. For producing the opposite or a p-type region in the exemplified silicon or germanium material, an acceptor dopant may be employed and it can be at least one element from group III of the periodic table, for example indium, gallium, aluminum or boron.

The detecting device 10 comprises a member or wafer 12 which is so formed geometrically as to provide responding means for detecting the modulating information from an input carrier signal. The responding means include, here in stratified relation, a p-type region 14 and an n-type region 16 crystally adjoined therewith and forming a p-n junction 18. As a matter of definition, it is intended that the words "crystally adjoined" denote a relation in which adjacent regions of opposite semiconductivity types form a continuous crystalline structure through a p-n junction. In this embodiment of the invention, the n-type region 16 is formed by a diffusion process, namely by placing the wafer 12, which can be entirely of p-type as grown, with suitable masking oxide films on the sides and back, in a diffusion furnace under the proper temperature and gas pressure conditions and by introducing a donor dopant to the desired depth in the wafer 12 by diffusion of the donor from its gaseous state. The capacitive, resistive and rectifying properties of the detecting device 10, the significance and nature of which will subsequently become more apparent, depend upon the dimensional parameters of the regions 14 and 16 as well as the materials selected for use, the dopant concentrations in the device 10 and other factors within the knowledge of skilled artisans in the pertaining art.

Although the detecting device 10 can be integrated with a larger functional block or member of semiconductive material, so as to function cooperatively with other solid state circuitry in that block, an ohmic or nonrectifying input terminal 20, an output terminal 24 and a common terminal 22 are provided in this embodiment of the invention as means for enabling incoming and outgoing conductive connections to be made to external circuitry. Thus, the terminals 20, 22 and 24 can be formed from a highly conductive and relatively neutral material, such as gold or gold alloyed with a neutral material such as silver or lead, in the form of a foil which is alloyed to the wafer 12. It is preferred that the alloys forming terminals 20 and 24 be highly doped with a donor dopant, for example gold or silver with 1% phosphorus, and that the alloys forming terminal 22 be highly doped with an acceptor dopant, for example gold or silver alloyed with antimony or indium, so as to ensure a non-rectifying or ohmic relationship between these terminals and the n-type region 16 and the p-type region 14, respectively. To obtain a significantly resistive path between the terminals 20 and 24, it is preferred that these terminals be located adjacent opposite sides of the n-type region 16. Similarly, to obtain a substantially uniformly distributed capacitive effect over the length of the resistive path just described, it is preferred that the terminal 22 be formed as shown in FIG. 1, as a layer over substantially the entire outer face of the p-type region 14 so as to provide an equipotential surface.

Figure 4:
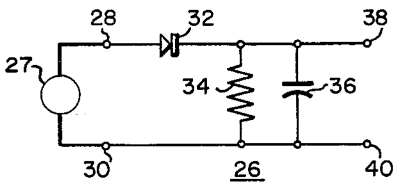
FIG. 4 is a schematic diagram of a conventional detecting circuit having integrated circuit elements.
Figure 5:
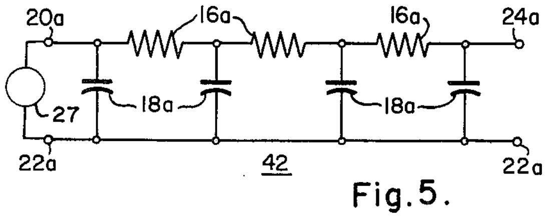
FIG. 5 is a schematic diagram of a circuit which is approximately equivalent to the solid state circuitry of the device in FIG. 3 with respect to positive components of a carrier signal.

In order to understand the operation of the device of FIG. 1, reference should be made to the circuits of FIGS. 4 and 5. In FIG. 4 there is illustrated a conventional detecting circuit 26 to which a modulated carrier signal is transmitted from modulated signal source means 27 through input terminals 28 and 30. A diode 32 blocks negative components of the signal while passing positive signal components. A resistive element 34 and a capacitive element 36 are so valued as generally to be poorly responsive to high frequency signals and therefore essentially only the envelope of the positive component of the modulated carrier signal tends to be produced between the output terminals 38 and 40. However, the output signal at terminals 38 and 40 is not an accurate reproduction of the envelope of the carrier signal because there is some tendency of the elements 34 and 36 to pass high frequency components and, as a result, a high frequency ripple appears in the output signal. In effect, therefore, the elements 34 and 36 do not fully filter high frequency components from the output signal.

The degree to which the desired filtering is obtained may be defined by consideration of the cut-off frequency as determined by the RC time constant of the elements 34 and 36 and the rate at which a given carrier signal is attenuated as a function of carrier frequency. Characteristically, the circuit 26 attenuates carrier signals at the rate of approximately 6 db per octave beyond the RC time constant or cut-off frequency. If the circuit 26 is modified to include a plurality of resistive elements and capacitive elements in a manner similar to that shown in FIG. 5, the attenuation rate, as can be explained mathematically, may be increased to a value of 12 db per octave.

A circuit 42 of FIG. 5 is only approximately equivalent to the solid state circuitry of the detecting device 10 of FIG. 1 because the former includes integrated components, whereas the latter exhibits distributed parameters, and is presented here only for the purpose of providing added clarity. In addition, the circuit 42 is valid only for positive components of a carrier signal. The resistive path which exists, as previously noted, through the n-type region 16 between the terminals 20 and 24 is represented in the circuit 42 by a series of resistive elements **16*a*. Further, as is well known, a capacitive effect is produced between two crystally adjoining and oppositely typed semiconductive regions when a voltage gradient of reverse polarity is placed across these regions. Therefore, with respect to the positive components of a carrier signal, a capacitive effect is distributed over the area of the junction 18 between the n-type region 16 and the p-type region 14 on the device 10. Accordingly, in the circuit 42, the distributed capacitive effect is approximately represented by integrated capacitive elements 18*a* connected between common terminal 22*a* and points over the length of the path between input terminal 20*a* and output terminal 24*a*. As the number of appropriately valued elements 16*a* and 18*a* is increased, the circuit 42 becomes more distributively characterized and therefore more closely equivalent to the solid state circuitry of the detecting device 10**.

Figure 6:
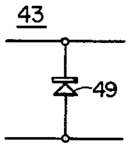
FIGS. 6 and 7 are schematic diagrams of circuits which are approximately equivalent to the solid state circuitry of the device of FIG. 3 with respect to negative components of the same signal.
Figure 7:
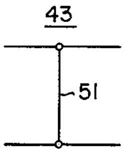
Figure 8:
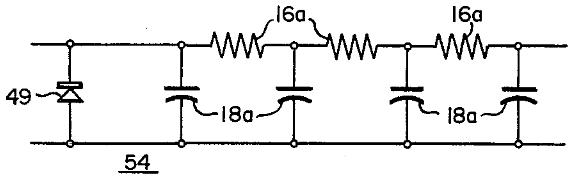
FIG. 8 is a schematic diagram of a circuit which is approximately equivalent to the solid state circuitry of the device of FIG. 3 with respect to the entire carrier signal.

With respect to negative components of the modulated carrier signal delivered to the detecting device 10 of FIG. 1, an equivalent circuit 43 can be approximated with the presence of a diode 49 as shown in FIG. 6 or, in effect, substantially with the presence of a shorting path 51 as shown in FIG. 7. Thus, the solid state circuitry of the device 10, with respect to the entire carrier signal, may be represented by an approximately equivalent circuit 54 as shown in FIG. 8.

That the functional behavior of the detecting device 10 in responding to a modulated carrier signal corresponds generally to the functioning of the circuit 54 has been experimentally verified. Thus, the functioning of the diode 49, namely the substantial shorting of negative components of the carrier signal and the blocking of positive components of the carrier signal, is exhibited substantially between the device terminals 20 and 22 rather than being distributed over the length of the path between the input terminal 20 and the output terminal 24 or, at the other extreme, between the terminals 24 and 22. If rectification did occur substatnially between the terminals 22 and 24 rather than between the terminals 20 and 22, it is clear that the entire carrier signal would be substantially attenuated so that the modulating envelope of the input signal would have little or no amplitude remaining to enable detection. Similarly, if the rectifying effect were distributed over the path between the terminals 20 and 24 attenuation of the carrier signal prior to detection would occur but to a lesser extent than in the extreme case just indicated.

In practice the detecting device 10 produces little or no attenuation of the carrier envelope thereby vertifying the fact that the rectifying effect does occur substantially between the terminals 20 and 22. Therefore, from a physical point of view, it is likely that relatively heavy carrier movement between the terminals 20 and 22 in the detecting device 10 occurs during the time that negative components of the modulated carrier signal are impressed across these terminals. Accordingly, there is good reason for utilizing rather than eliminating the rectifying effect, with the latter being otherwise realized through the use of a reverse biasing voltage, when its presence does in fact enhance the detecting function of the device 10.

Figures 9, 13:
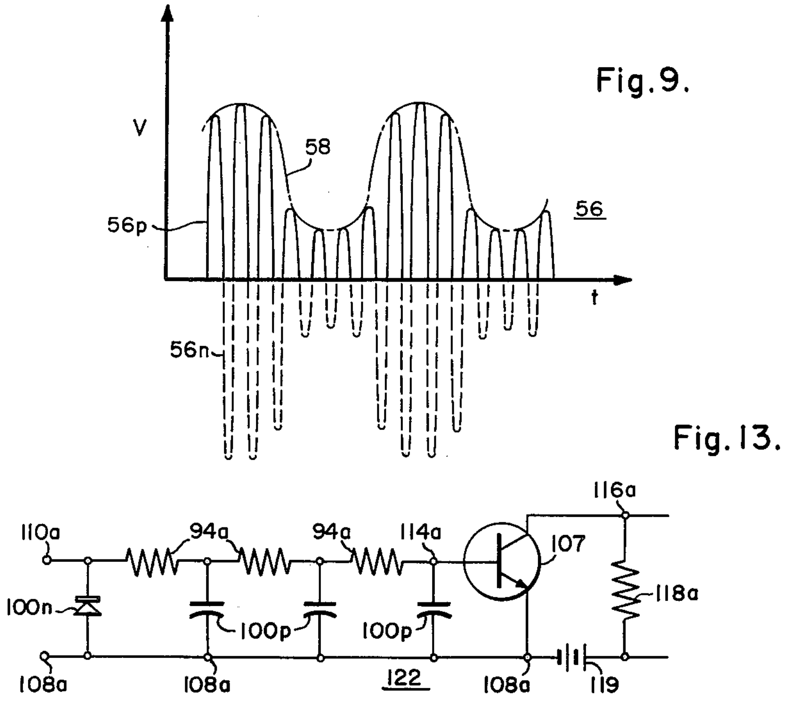
FIG. 9 is a graphic representation of an amplitude modulated signal, with its envelope, which is to be detected by the device of FIG. 3, shown in dashed outline.
FIG. 13 is a schematic diagram of a circuit which is approximately equivalent to the solid state circuitry of the device of FIG. 10.

To clarify the operation of the detecting device 10, reference is now to be made to FIG. 9 where there is shown a carrier signal 56 which is varied in amplitude by a modulating signal so that an envelope 58 is produced. The modulated carrier signal 56 is delivered by suitable means on an incoming basis to the terminals or portions 20 and 22, and, because of the diode action just described, a negative portion 56*n* of the carrier signal 56 is substantially short-circuited and therefore prevented from appearing, on an outgoing basis, across the terminals 24 and 22. In addition, the resistive effect presented by the region 16 and the capacitive effect between the regions 16 and 14 produce a filtering of a positive portion 56*p* of the carrier signal 56 such that the signal appearing across the terminals 24 and 22 substantially conforms to the envelope 58 with little or no high frequency components being present therein. Test results verifying this fact will be set forth subsequently.

It was previously set forth that any of several methods can be employed in producing the detecting device 10. Thus, in FIG. 2 there is exemplified another embodiment of the invention in the form of a semiconductor detecting device 60 which is formed by an alloying process. In this instance, a wafer 62 of bulk semiconductive material of one semiconductivity type, for example p-type silicon, is utilized to form a p-type region 64. By applying a layer 69 of a relatively neutral material such as gold doped with a donor dopant, an n-type region 66 can be alloyed in crystally adjoining relation with the p-type region 64 and a p-n junction 68 is thereby created. A lead wire 70 can then be secured directly to the region 66 by any suitable method, such as by pressure bonding. Terminals 72 and 74 are provided on the p-type region 64 in a manner similar to that described in connection with the terminals 20 and 24 of the detecting device 10 in FIG. 1. Characteristically, an alloyed p-n junction produces greater capacitance per unit area than does a diffused p-n junction. This is because of the narrower depletion layer in the alloyed junction. Therefore, for a given set of dimensional parameters the device 60 produces a greater capacitive effect in operation than does the device 10.

Figures 2, 3:
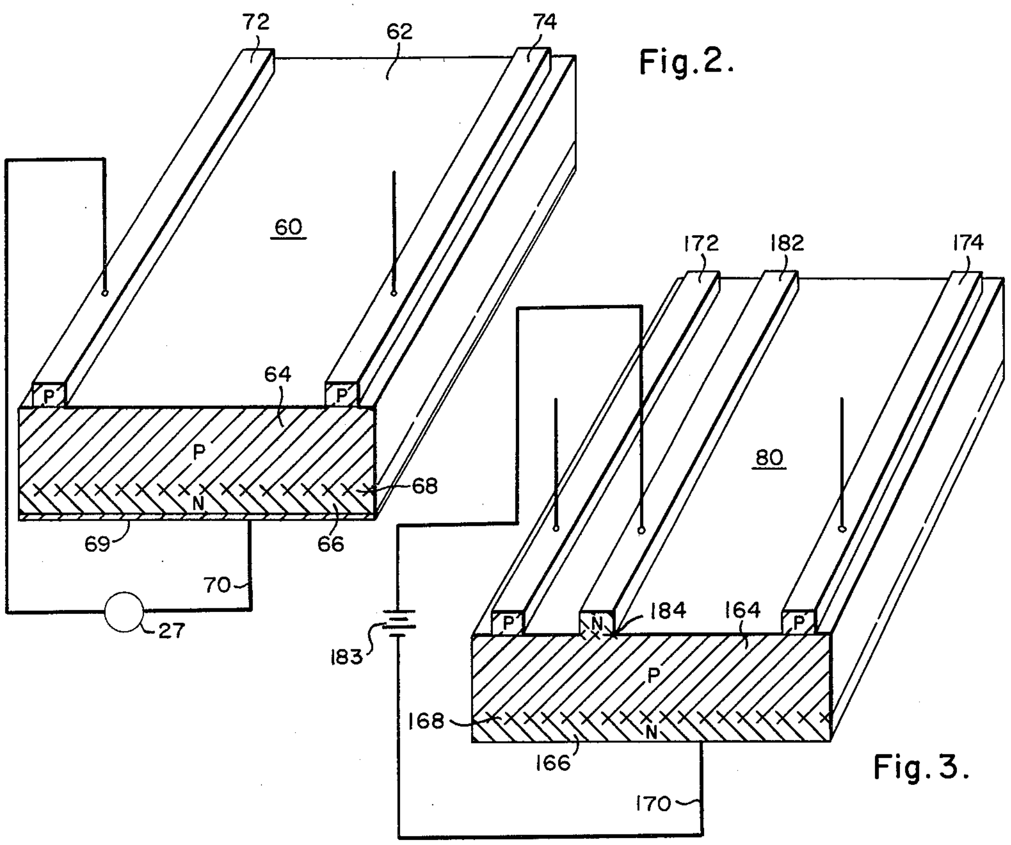
FIG. 2 is a perspective view partly in cross-section of another semiconductor device formed in accordance with the principles of the invention.
FIG. 3 is a perspective view partly in cross-section of still another semiconductor device formed in accordance with the principles of the invention.

In FIG. 3, there is illustrated a device 80 in which there is included a feature that can be provided in either the device 10 or the device 60 or other embodiments of the invention. Thus, the device 80 in this instance is similar to the device 60, with an additional terminal 182 being provided intermediately of the terminals 172 and 174. The terminal 182 is crystally adjoined to the p-type region 164 in a manner similar to that described in connection with the terminals 172 and 174 in FIG. 2, but in this instance the terminal 182 is doped oppositely from the region 164. Thus, a donor rather than an acceptor dopant is provided in the terminal 182.

In this manner, a p-n junction 184 is formed between the terminal 182 and the p-type region 164 so as to produce a rectifying or highly resistive effect in a serial path between the terminal 182 and the lead wire 170. Thus, by connecting the positive terminal of a power supply 183 to the terminal 182 and the common terminal of the power supply to the lead wire 170 a slightly forward biasing voltage is produced across the junction 168 with little or no current being produced over the serial path between the terminal 182 and the lead wire 170. With a forward voltage bias across the p-n junction 168, greater sensitivity is provided in the detecting function because the normal reverse bias or forward drop across the junction is then overcome and a more efficient shorting of carrier components of one polarity, in this case negative, is thereby obtained.

Figure 10:
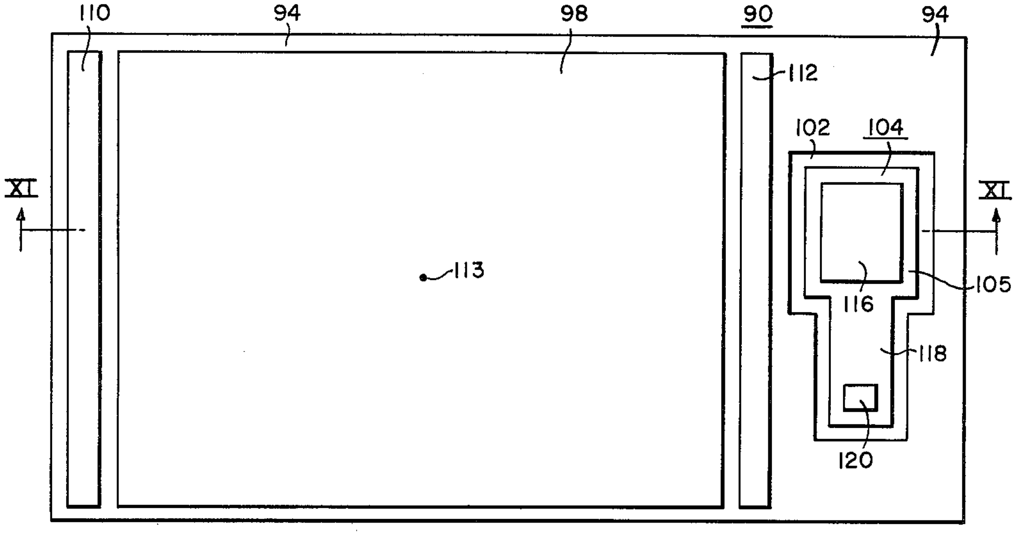
FIG. 10 is a top plan view of a detecting-amplifying device formed in accordance with the principles of the invention.
Figure 11:
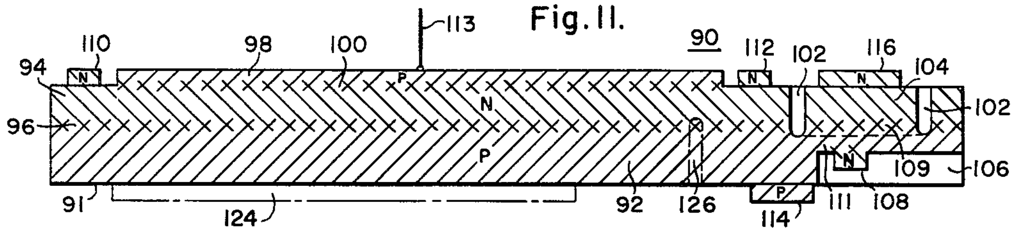
FIG. 11 is a cross-sectioned view of the device of FIG. 10 taken along the reference line XI—XI, thereof.
Figure 12:
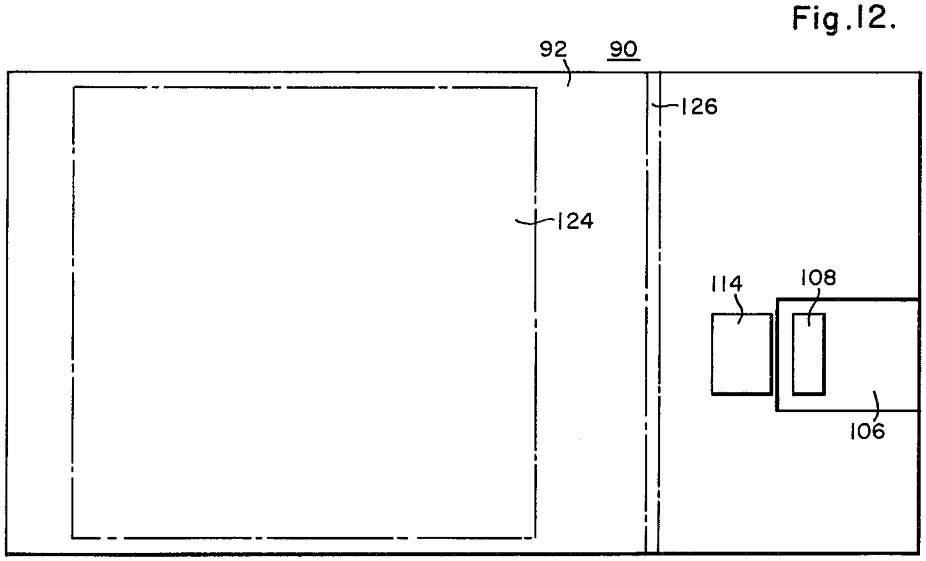
FIG. 12 is a bottom plan view of the device of FIG. 10.

There is illustrated in FIGS. 10 through 12 a semiconductor device 90 having responding means for detecting and amplifying the modulating information from a modulated carrier signal. The selection of materials and the selection of method of fabrication described in connection with the detecting device 10 of FIG. 1 apply equally here. However, in the interest of clarity, a description will subsequently be presented as to the materials used and the procedures employed in the production of several samples of the device 90.

In the embodiment shown in FIG. 11, the responding means include a p-type region 92, which is formed by the bulk material of a wafer 91, and an n-type region 94 which is diffused into the wafer 91 so as to produce a p-n junction 96. Subsequently a p-type metal, such as aluminum, is alloyed to the region 94 to form a p-type region 98 and another p-n junction 100. The regions 94 and 98 and the p-n junction 100 function in a manner similar to that described in connection with the detecting device 10 of FIG. 1.

Isolating means or an etched or scribed channel 102, as observed in FIGS. 10 and 11, is provided through the n-type region 94, and preferably through the junction 96, so as to produce an isolated n-type region 104, of which a portion 105 functions as a collector of amplifying means for an amplifying combination. In addition, where the p-type region 92 is greater than a predetermined thickness, it can be notched as indicated by the reference character 106 so as to enable a region 108 to be adjoined crystally to the p-type region 92 in proximity to an isolated portion 109 of the p-n junction 96 and generally in alignment with the collector 105. With this arrangement, the region 108, functioning as an emitter, the adjacent portion 111 of the p-type region 92, functioning as a base, and the collector 105 can cooperate to amplify signals impressed across the emitter and base regions 108 and 111. Terminal 110, generally corresponding to the terminal 20 of FIG. 1, is provided in nonrectifying or ohmic relation with the n-type region 94. In addition, ohmic terminals 112 and 114 are provided respectively for the regions 94 and 92 in proximity to the previously noted amplifier combination. An ohmic terminal 116 is also provided for the collector 105.

It is to be noted that the channel 102 is so formed as to produce an elongated portion 118 in the region 104. The elongated portion 118, being extended longitudinally from the collector 105, provides a resistive path between the collector terminal 116 and another ohmic terminal 120 provided for connection to the positive terminal of a power supply (not shown). It is preferred that path means or an ohmic path be provided between the terminal 112 and the base terminal 114 in order to provide for ready transmittal of carriers between the region 94 and the base 111. This can be accomplished, for example, by discharging a capacitor through the serial path between the terminals 112 and 114 thereby to break down the junction 96 in the vicinity of the serial path.

A circuit 122, which is approximately equivalent to the solid state circuitry of the detecting-amplifying device 90, is shown in FIG. 13. A modulated carrier signal, for example the signal 56 of FIG. 9, is delivered to input terminal 110*a* and common terminal 108*a*, with the negative components of the signal being substantially shorted through a diode 100$n$ and the positive components of the signal being filtered by resisting elements 94$a$ and capacitive elements 100$p$. The envelope 58 of the signal 56 is produced across terminals 114$a$ and 108$a$, which form the base and emitter terminals respectively of an amplifier element 107.

The detected signal is then amplified in the regular manner so that a more highly powered signal appears across a load resistive element 118$a$. A power supply 119 is, of course, included for the purpose of energizing the amplifier 107. The amplifier 107 is so provided as to respond substantially only to audio or other low frequency signals so as to produce supplementary attenuation of the carrier signal and thereby provide a more accurate reproduction of the carrier envelope 58.

In the detecting-amplifying device 90, the modulated carrier signal 56 is applied across the terminals 110 and 108, with the latter terminal as well as the region 98 through lead wire 113, being commonly connected or grounded. In addition, a power supply (not shown) is connected between the terminals 120 and 108 thereby to provide the necessary energy for amplification. The negative components 56$n$ of the signal 56 are shorted between the region 98 and the terminal 110 while the positive components 56$p$ are filtered by the distributed resistance along the region 94 and the distributed capacitance across the p-n junction 100. The envelope 58 is thereby detected and delivered as a signal across the terminal 108 and the base 111. The detected envelope 58 is amplified and, if desired, further filtered by the amplifying means for delivery to external circuitry through use of connections (not shown) made to the collector terminal 116 and the power supply terminal 120.

Where an additional or an alternative distributed capacitive effect is desired to obtain alternative filtering properties in the detecting-amplifying device 90, a p-type terminal region 124, comprising for example acceptor doped gold, can be alloyed or otherwise formed in crystally adjoining relation with the p-type region 92. The p-type region 124 can be connected to ground so that the p-n junction 96 then provides an additional or alternative capacitive effect between the terminals 110 and 112 and ground. The use of the p-type region 124 produces a resistive path between the base 111 and ground through the p-type region 92, but this effect and its consequent power losses can be minimized through the use of an etched or scribed channel 126 in the p-type region 92 to the desired depth, preferably through the p-n junction 96.

The description which follows represents the procedure and materials employed in producing specific examples of the amplifier detector 90. A p-type wafer or member 91 of silicon, being doped with boron, was provided with an n-type surface layer 94 by vapor diffusion of phosphorus as a dopant. The diffused n-type layer resulting from the diffusion process on the sides and opposite face of the block was removed by lapping and etching. In this manner, a p-n junction 96 was formed. Subsequently a layer of aluminum was fused to the n-type layer 94 to produce a p-type region 98 and another p-n junction 100. Layers of gold with n-type doping material were then fused to the diffused layer 94 to form ohmic terminals 110, 112 and 116 and 120. A region 104 was formed by etching a circumscribing channel 102 to a depth greater than that of the p-n junction 91. A notch 106 was etched to a depth short of the p-n junction 96 for reception of an emitter terminal 108. The emitter 108 and a base terminal 114 were then formed by fusion of gold with n-type doping material and gold with p-type doping material, respectively, to the p-type region 92. An ohmic path was then established between the terminal 112 and the base terminal 114 by discharging a capacitor in the forward direction through these terminals.

The produced samples of the device 90 provided excellent results. When tested, the following pertinent data was determined:

*Detector-amplifier results*

| DC Supply | Percent Modulation | AC Input Volts | AC Output Volts | RF Output Volts | Audio Voltage Gain | RF Voltage Att., db |
|---|---|---|---|---|---|---|
| 22.5 v. | 40 | .8 | 20 | .005 | 25 | 36 |

Where:

Percent modulation=ratio of amplitude of modulating envelope to maximum amplitude of carrier signal.
AC Input Volts=peak value of modulated carrier signal.
AC Output Volts=peak value of detected envelope.
RF Output Volts=amplitude of high frequency ripple included in the detected envelope.
Audio Voltage Gain=ratio of AC output to AC input.
RF voltage attenuation: determined from the ratio of AC input to RF output.

Produced samples of the detecting device 10 were also tested for performance, and the test results showed that in the detected envelope the carrier or RF voltage was attenuated to a level between 18 and 20 db below the input level. It is therefor clear that the described embodiments of the invention including the detecting device 10 and the detecting-amplifying device 90 efficiently detect the envelope of a delivered modulated carrier signal.

In the foregoing description, several embodiments of the invention have been described only to illustrate the general principles of the invention. Accordingly, it is desired that the invention be not limited by the illustrattive embodiments, but rather that it be limited only by the scope and spirit of its broad principles.

What is claimed is:

1. A semiconductor detecting device comprising a monolithic semiconductor member, said member having means for responding to an input modulated carrier signal so as to produce an output signal defining the modulating information upon those components of said input signal having one polarity, said responding means including a region of one type semiconductivity and a second region of the opposite type semiconductivity, said regions being crystally adjoined to provide a p-n junction, one of said regions having an input portion spaced from an output portion, the other of said regions having at least one portion for incoming and outgoing delivery of signals, the distributed capacitance between said regions and the resistance of said one region between said input and output portions being so correlated as to enable the production of said output signal, said p-n junction substantially providing a shorting path for those components of said input signal having the other polarity, and means for forwardly biasing said p-n junction.

2. A semiconductor detecting device comprising a monolithic semiconductor member, said member having means for responding to an input modulated carrier signal so as to produce an output signal defining the modulating information upon those components of said input signal having one polarity, said responding means including a region of one type semiconductivity and a second region of the opposite type semiconductivity, said regions being crystally adjoined to provide a p-n junction, one of said regions having an input portion spaced from an output portion, the other of said regions having at least one portion for incoming and outgoing delivery of signals, the distributed capacitance between said regions and the resistance of said one region between said input and output portions being so correlated as to enable the production of said output signal, said p-n junction substantially providing a shorting path for those components of said input signal having the other polarity, means for forwardly biasing said p-n junction, said biasing means including a third region of semiconductivity type opposite that of said one region, said third region being crystally adjoined to said one region to provide another p-n junction, and said biasing means including a voltage source connected across said third region and said other region.

3. A semiconductor device comprising a monolithic semiconductor member, said member having means for responding to an input modulated carrier signal so as to produce an output signal defining the modulating information upon those components of said input signal having one polarity, said responding means including a region of one type semiconductivity and a second region of the opposite type semiconductivity, said regions being crystally adjoined to provide a p-n junction, one of said regions having an input portion spaced from an output portion, the other of said regions having at least one portion for incoming and outgoing delivery of signals, the distributed capacitance between said regions and the resistance of said one region between said input and output portions being so correlated as to enable the production of said output signal, said p-n junction substantially providing a shorting path for those components of said input signal having the other polarity, and an amplifying combination formed as an integral portion of said semi-conductor member, a carrier path disposed between said output portion of said one region and an input of said amplifier combination for delivery of said output signal, said amplifying combination being energizable to amplify said output signal and also being operative to filter high frequency components from said output signal to the extent said amplifying combination is non-responsive to the latter components.

4. A semiconductor detecting-amplifying device comprising a monolithic semiconductor member, said member having means for responding to an input modulated carrier signal so as to produce an output signal defining the modulating information upon those components of said input signal having one polarity, said responding means including a first stratified region of one semiconductivity type and a second stratified region of the opposite semiconductivity type crystally adjoining one side of said first region to provide a first p-n junction, a third stratified region of the opposite semiconductivity type crystally adjoining the opposite side of said first region to provide a second p-n junction, a channel extending through said opposite side of said first region and substantially through said first p-n junction to isolate a portion of said first region from the remainder of the same, another region of said one semiconductivity type crystally adjoining said second region in proximity to the portion of said first p-n junction isolated with said first region portion by said channel, means for delivering said modulated carrier signal across the outer side of said third region and an input portion of the remainder of said first region, the distributed capacitance between said first and third regions and the resistance of said remainder of said first region between its input portion and an output portion thereof being so correlated as to enable the production of an output signal across the outer side of said third region and said output portion of said remainder of said first region, said output signal defining modulating information upon said carrier signal and path means delivering said output signal across said other region and a portion of said second region proximate to said other region, and regionally formed means including said other region and said second region portion for amplifying said output signal.

5. A semiconductor detecting-amplifying device comprising a monolithic semiconductor member, said member having means for responding to an input modulated carrier signal so as to produce an output signal defining the modulating information upon those components of said input signal having one polarity, said responding means including a first stratified region of one semiconductivity type and a second stratified region of the opposite semiconductivity type crystally adjoining one side of said first region to provide a first p-n junction, a third stratified region of the opposite semiconductivity type crystally adjoining the opposite side of said first region to provide a second p-n junction, a channel extending through said opposite side of said first region and substantially through said first p-n junction to isolate a portion of said first region from the remainder of the same, another region of said one semiconductivity type crystally adjoining said second region in proximity to the portion of said first p-n junction isolated with said first region portion by said channel, means for delivering said modulated carrier signal across the outer side of said third region and an input portion of the remainder of said first region, means for electrically connecting the outer side of said third region and a remote portion of said second region to said other region, the distributed capacitance between said first and third regions and between said first region and said remote portion of said second region and the resistance of said remainder of said first region between its input portion and an output portion thereof being so correlated as to enable the production of a detected output signal across said other region and said output portion of said remainder of said first region, path means delivering said output signal for application across said other region and a portion of said second region proximate to said other region, and regionally formed means including said other region and said second region other portion for amplifying said output signal.

6. A semiconductor detecting-amplifying device comprising a monolithic semiconductor member, said member having means for responding to an input modulated carrier signal so as to produce an output signal defining the modulating information upon those components of said input signal having one polarity, said responding means including a first stratified region of one semiconductivity type and a second stratified region of the opposite semiconductivity type crystally adjoining one side of said first region to provide a first p-n junction, a third stratified region of the opposite semiconductivity type crystally adjoining the opposite side of said first region to provide a second p-n junction, a channel extending through said opposite side of said first region and substantially through said first p-n junction to isolate a portion of said first region from the remainder of the same, another region of said one semiconductivity type crystally adjoining said second region in proximity to the portion of said first p-n junction isolated with said first region portion by said channel, means for delivering said modulated carrier signal across the other side of said third region and an input portion of the remainder of said first region, the distributed capacitance between said first and third regions and the resistance of said remainder of said first region between its input portion and an output portion thereof being so correlated as to enable the production of an output signal across said third region and said output portion of said remainder of said first region, said output signal defining modulating information upon said carrier signal and path means delivering said output signal across said other region and a portion of said second region proximate to said other region, said first region portion being elongated and having a collector terminal adjacent one end thereof and generally aligned with the geometric extent of said other region, said first region portion also having another terminal adjacent the other end thereof and being out of alignment with said other region, and regionally formed means including said other region and said second region portion and said first region portion for amplifying said output signal with the path through said first region portion between said terminals functioning as a load resistance.

7. A semiconductor detecting-amplifying device comprising a monolithic semiconductor member, said member having means for responding to an input modulated carrier signal so as to produce an output signal defining the modulating information upon those components of said input signal having one polarity, said responding means including a first stratified region of one semiconductivity type and a second stratified region of the opposite semiconductivity type crystally adjoining one side of said first region to provide a first p-n junction, a third stratified region of the opposite semiconductivity type crystally adjoining the opposite side of said first region to provide a second p-n junction, a channel extending through said opposite side of said first region and substantially through said first p-n junction to isolate a portion of said first region from the remainder of the same, another region of said one semiconductivity type crystally adjoining said second region in proximity to the portion of said first p-n junction isolated with said first region portion by said channel, means for delivering said modulated carrier signal across the outer side of said third region and an input portion of the remainder of said first region, means for electrically connecting said third region and a remote portion of said second region to said other region, the distributed capacitance between said first and third regions and between said first region and said remote portion of said second region and the resistance of said remainder of said first region being so correlated as to enable the production of a detected output signal across said other region and said output portion of said remainder of said first region, path means delivering said output signal for application across said other region and a portion of said second region proximate to said other region, means for substantially isolating said remote and proximate portions of said second region, and regionally formed means including said other region and said second region other portion for amplifying said output signal.

8. A semiconductor detecting-amplifying device comprising a monolithic semiconductor member, said member having means for responding to an input modulated carrier signal so as to produce an output signal defining the modulating information upon those components of said input signal having one polarity, said responding means including a first stratified region of one semiconductivity type and a second stratified region of the opposite semiconductivity type crystally adjoining one side of said first region to provide a p-n junction, a channel extending through the opposite side of said first region and substantially through said p-n junction to isolate a portion of said first region from the remainder of the same, another region of said one semiconductivity type crystally adjoining said second region in proximity to the portion of said first p-n junction isolated with said first region portion by said channel, means for delivering said modulated carrier signal across the outer side of a remote portion of said second region and an input portion of the remainder of said first region, means for substantially isolating said remote portion of said second region and a portion of said second region proximate to said other region, the distributed capacitance between said remainder of said first region and said remote portion of said second region and the resistance of said remainder of said first region between its input portion and an output portion thereof being so correlated as to enable the production of a detected output signal across the outer side of said second region and said output portion of said remainder of said first region, path means for delivering said output signal across said other region and said second region proximate portion, and regionally formed means including said other region and said second region proximate portion for amplifying said output signal.

9. A detector circuit comprising means for generating a modulated carrier signal and a semiconductor device comprising a monolithic semiconductor member, said member having input means for responding to said modulated carrier signal so as to produce an output signal defining the modulating information upon those components of said modulated carrier signal having one polarity, said input means including a region of one type semiconductivity and a second region of the opposite type semiconductivity, said regions being crystally adjoined to provide a p-n junction, one of said regions having an input portion spaced from an output portion, the other of said regions having at least one portion for incoming and outgoing delivery of signals, the distributed capacitance between said regions and the resistance of said one region between said input and output portions being so correlated as to enable the production of said output signal, and said p-n junction substantially providing a shorting path between said one region input portion and said other region portion for those components of the input signal having the other polarity.

10. A detector circuit comprising means for generating a modulated carrier signal and a semiconductor detecting device comprising a monolithic semiconductor member, said member having input means for responding to said modulated carrier signal so as to produce an output signal defining the modulating information upon those components of said modulated carrier signal having one polarity, said responding means including a region of one type semiconductivity and a second region of the opposite type semiconductivity, said regions being crystally adjoined to provide a p-n junction, one of said regions having an ohmic input terminal spaced from an ohmic output terminal, and other of said regions having at least one ohmic terminal for incoming and outgoing delivery of signals, the distributed capacitance between said regions and the resistance of said one region between said input and output terminals being so correlated as to enable the production of said output signal, and said p-n junction substantially providing a shorting path between said one region input terminal and said other region terminal for those components of the input signal having the other polarity.

11. A semiconductor detecting-amplifying device comprising a monolithic semiconductor member, said member having means for responding to an input modulated carrier signal so as to produce an output signal defining the modulating information upon those components of said input signal having one polarity, said responding means including a region of one type semiconductivity and a second region of the opposite type semiconductivity, said regions being crystally adjoined to provide a p-n junction, one of said regions having an input portion spaced from an output portion, the other of said regions having at least one portion for incoming and outgoing delivery of signals, the distributed capacitance between said regions and the resistance of said one region between said input and output portions being so correlated as to enable the production of said output signal, said p-n junction substantially providing a shorting path between said one region input portion and said other region portion for those components of said input signal having the other polarity, said member further including transistor means for amplifying said output signal and for filtering high frequency components from said output signal to the extent said amplifying means is nonresponsive to said components, and a carrier path disposed between said output portion of said one region and an input of said transistor amplifier means for delivery of said output signal thereto.

12. A semiconductor device comprising a monolithic semiconductor member, said member including regionally formed diode and resistive capacitive detecting means for producing an output signal defining modulating information upon an input modulated carrier signal, said member also including a transistor regional combination having base and emitter and collector regions for amplifying said output signal, a carrier path in said member from an output portion of said detecting means to said transistor combination, and external conductive means connecting another output portion of said detecting means to said transistor combination so as to apply said output signal to said transistor base and emitter regions.

13. A semiconductor detecting device comprising a monolithic semiconductor member, said member having means for responding to an input modulated carrier signal so as to produce an output signal defining the modulating information upon those components of said input signal having one polarity, said responding means including a region of one type semiconductivity and a second region of the opposite type semiconductivity, said regions being crystally adjoined to provide a p-n junction, one of said regions having an input portion spaced from an output portion, the other of said regions having at least one portion for incoming and outgoing delivery of signals, the distributed capacitance between said regions and the resistance of said one region between said input and output portions being so correlated as to enable the production of said output signal, said p-n junction substantially providing a shorting path between said one region input portion and said other region portion for those components of said input signal having the other polarity, and a third region of semiconductivity type opposite that of said one region, said third region crystally adjoined to said one region to provide another p-n junction which is operative to effect a slight forward bias across the first mentioned p-n junction when a voltage source is connected across said third and said other regions.

14. A semiconductor device comprising a monolithic semiconductor member, said monolithic member including regionally formed diode and resistive and capacitive detecting means producing an output signal defining modulating information upon an input modulated carrier signal whereby the signal detection is confined within said monolithic member, said monolithic member also including regionally formed means for amplifying said output signal, and means including at least one current carrier path in said monolithic member for coupling said output signal from said detecting means to said amplifying means.

References Cited by the Examiner

UNITED STATES PATENTS

| | | | |
|---|---|---|---|
| 2,662,976 | 12/53 | Pankove | 317—101 X |
| 2,900,531 | 8/59 | Wallmark | 307—88.5 |
| 2,927,204 | 3/60 | Wilhelmsen | 317—101 X |
| 2,936,384 | 5/60 | White | 307—88.5 |

OTHER REFERENCES

Electronics Magazine, pp. 49–52, Dec. 11, 1959.

ROY LAKE, *Primary Examiner.*

ROBERT H. ROSE, ALFRED L. BRODY, *Examiners.*